United States Patent [19]

Lee et al.

[11] 4,432,893

[45] Feb. 21, 1984

[54] PRECIPITATION-ADSORPTION PROCESS FOR THE DECONTAMINATION OF NUCLEAR WASTE SUPERNATES

[75] Inventors: Lien-Mow Lee, North Augusta; Lester L. Kilpatrick, Aiken, both of S.C.

[73] Assignee: The United States of America as represented by the Department of Energy, Washington, D.C.

[21] Appl. No.: 379,800

[22] Filed: May 19, 1982

[51] Int. Cl.[3] .................... C09K 3/00

[52] U.S. Cl. .................... 252/631; 210/682; 423/2; 423/12

[58] Field of Search .................... 210/682; 252/631; 423/2, 12

[56] References Cited

U.S. PATENT DOCUMENTS 2,982,785 5/1961 McKenzie et al. .................... 568/6

4,161,513 7/1979 Forberg et al. .................... 423/598

OTHER PUBLICATIONS

Lynch et al., Management of Radioactive Wastes from the Nuclear Fuel Cycle, vol. 1, 1976, IAEA—S-M—207/75, pp. 361 to 373.

Reilley, Ed., Advances in Analytical Chemistry and Instrumentation, vol. I, Interscience Pub. Inc., N.Y., 1960, pp. 1 to 29 and 69 to 77.

Kahn et al., Analytical Chemistry, vol. 29, 1957, pp. 1210 to 1213.

Handley et al., Analytical Chemistry, vol. 31, 1959, pp. 332 to 334.

Bond, Department of Energy Report, MLM, Dec. 11, 1981, pp. 24 to 31.

Bond et al., Department of Energy Report, MLM 2929, Apr. 19, 1982, pp. 1 to 10.

*Primary Examiner*—Leland A. Sebastian

[57] ABSTRACT

High-level nuclear waste supernate is decontaminated of cesium by precipitation of the cesium and potassium with sodium tetraphenyl boron. Simultaneously, strontium-90 is removed from the waste supernate sorption of insoluble sodium titanate. The waste solution is then filtered to separate the solution decontaminated of cesium and strontium.

21 Claims, 2 Drawing Figures

PRECIPITATION-ADSORPTION PROCESS FOR THE DECONTAMINATION OF NUCLEAR WASTE SUPERNATES

BACKGROUND OF THE INVENTION

Field Of The Invention And Contract Statement

The invention relates to the decontamination of nuclear waste solutions and more particularly to the removal of cesium, plutonium and strontium values from high-level nuclear waste solutions. The United States Government has rights in this invention pursuant to Contract No. DE-ACO9-76SR00001 between the U.S. Department of Energy and E. I. DuPont de Nemours & Co.

DISCUSSION OF BACKGROUND AND PRIOR ART

Many tens of millions of gallons of high level liquid nuclear waste (supernate including water soluble salts) have accumulated over the past 28 years of operation at the Savannah River Plant, Department of Energy. (Other D.O.E. facilities have similar accumulations.) The radioactivity of the Savannah River supernate is about 4 Ci/gallon of which more than 99 percent is contributed by cesium-137. The remaining radioactivity is from strontium-90, ruthenium-106, plutonium and other isotopes. The supernate is stored in carbon steel waste tanks which are unacceptable for permanent storage. It is desirable to decontaminate the supernate and solidify it in a concrete material (saltcrete). The radioactive elements removed from the supernate should be combined with sludge from the waste tanks and advantageously solidified in borosilicate glass. A requirement for supernate decontamination is that a decontamination factor (DF) of greater than $10^4$ must be obtained, so that the decontaminated salt solution can be safely disposed of in the saltcrete form. Toward this end, an ion exchange process has been successfully demonstrated but it is rather expensive to build and operate. (See copending application of the common assignee: Ser. No. 375,232, filed May 5, 1982).

Sodium tetraphenylboron (NaTPB) is a well-known precipitating agent for gravimetric analyses of potassium, rubidium and cesium. H. Flaschka and A. J. Barnard, Jr., "Tetraphenylboron (TPB) As An Analytical Reagent"; *Advances in Analytical Chemistry and Instrumentation,* Volume 1, (1960), Sec. I–III, pp. 1–29. There have been many attempts to use NaTPB as a precipitation agent for cesium from dilute aqueous solution but the results were not encouraging. B. Kahn, D. K. Smith and C. P. Straub, "Determination of Radioactive Cesium in Water", *Analytical Chemistry,* Volume 29, (1957), p.1210, discarded the possibility of using NaTPB for this purpose because of the difficulty encountered in settling the cesium tetraphenylboron (CsTPB) precipitate from the aqueous liquid. T. H. Handley and C. L. Burros, "Determination of Radioactive Cesium", *Analytical Chemistry,* Volume 31 (1959), p. 332, found that it was impossible to filter or centrifuge the CsTPB in acetone, and, therefore, it was recrystallized by adding absolute alcohol. The CsTPB precipitate obtained from the alcoholic solution was easily filtered, but the overall chemical yield was only 75 percent, that is, the decontamination factor (DF)$\leqq$3.

U.S. Pat. No. 2,982,785, McKenzie, Pasco and Schulz, described a solvent extraction process in which NaTPB in hexone was used to remove cesium from aqueous solutions. The DF's for the study therein were 2 and 6 when the pH's were 2 and 13, respectively. H. Flaschka and A. J. Barnard, Jr., cited hereinabove, Section VII, pp. 69–77, in particular, at p. 74, when nitrobenzene was used as a solvent, obtained a DF of 8,800$\pm$1400 over the pH range of 5 to 10. This is the highest DF reported in the known literature. Other shortcomings of these solvent exchange processes are: (1) a prolonged centrifugation was required to separate the phases because of emulsion formation; and (2) solvent extraction is intrinsically complicated.

Sodium titanate is known to have an affinity for strontium. It has been previously prepared in the form of an ion exchange material—U.S. Pat. No. 4,161,513. Sevald Forberg and Per-Inge Olsson. Forberg et al., however, does not show the use of sodium titanate slurry for ion exchange.

SUMMARY OF THE INVENTION

An object of the invention is to provide a process for the decontamination of nuclear waste solutions and more particularly for the removal of cesium, plutonium and strontium values from high-level nuclear waste solutions, such as, supernates and water soluble salts.

Other objects and advantages of the invention are set out herein or are obvious herefrom to one ordinarily skilled in the art.

The objects and advantages of the invention are achieved by the process of the invention.

To achieve the foregoing and other objects and in accordance with the purpose of the invention, as embodied and broadly described herein the process of the precipitation-adsorption involves a precipitation method for decontaminating nuclear waste solutions containing cesium, plutonium and strontium values. The invention includes contacting the waste solution with sufficient sodium tetraphenyl boron and insoluble sodium titanate to remove the cesium, plutonium and strontium values, respectively, from the solution and recovering the solution decontaminated of cesium, plutonium and strontium.

More narrowly the invention involves a process for the removal of cesium, plutonium and strontium values from a nuclear waste solution contaminated with such values. Such waste solution is simultaneously contacted with sufficient quantity of sodium tetraphenyl boron to precipitate the cesium and sufficient insoluble sodium titanate to sorb the plutonium and strontium, respectively, from the waste solution. The waste solution is filtered to separate the solution decontaminated of cesium, plutonium and strontium. The invention process is particularly advantageous for the removal of cesium, plutonium and strontium from high-level nuclear waste supernates. Basically, the invention is a precipitation (Cs), ion adsorption (Sr, Pu) process for nuclear waste supernate decontamination.

Very large cesium decontamination factors ($10^5$ to $10^6$) can be achieved by precipitating cesium and potassium with sodium tetraphenyl boron (NaTPB) from concentrated high-level waste (HLW) supernates. The precipitate aggromerates in HLW supernate and can be filtered easily. To obtain a DF of $10^5$, an excess of NaTPB above the amount of potassium in solution must be used. However, the cesium DF appears insensitive to the amount of NaTPB excess used.

The control of the sodium ($Na^+$) concentration in the nuclear waste supernate is very important in the precipitation process of the invention. Some of the tetraphenyl boron anions can be precipitated by sodium when concentration of sodium is too high. As a result, the sodium tetraphenyl boron (NaTPB) excess has to be increased to give a high cesium DF. Cesium decontamination factors (DFs) greater than $10^5$ are obtained at 5.5 M $Na^+$ or greater when the NaTPB excess is 0.025 M or greater, so preferably such an excess of NaTBP is used. The excess NaTPB can be recovered for reuse during the continuous washing of the slurry.

The contact time is important for cesium decontamination factor control. This effect is seen clearly when the NaTPB excess is not sufficient to give a high cesium DF after a few hours of contact time. The improvement of cesium DF with time is apparently caused by ion exchange between the NaTPB precipitate and the cesium ion in the nuclear waste supernate. There is a dynamic equilibrium between the NaTPB precipitate and $Na^+$ in the supernate. Some of the free tetraphenyl boron (TPB) anions produced when NaTPB goes into solution may precipitate $Cs^+$ in the solution and thus improves the cesium DF.

The cesium tetraphenyl boron precipitate is stable towards radiation and the chemicals in the nuclear waste supernate. No significant amount of cesium tetraphenyl boron is decomposed even after over a year in a slurry containing $4.4\times10^7$ disintegrations/minute/milliliters (d/m/ml) of $Cs^{137}$. This feature of the CsTPB allows in-tank processing.

The strontium in the high-level nuclear waste supernate is simultaneously removed by adsorption on a slurry of insoluble sodium titanate powder. For example, one (1) gram of sodium titanate is added to each liter of waste supernate to remove $Sr^{90}$ with a DF of 200 to 300 with a contact time of about one (1) hour. Experiments with SRP supernate samples under "in-tank" process conditions have shown that only 0.5 gram/liter of sodium titanate is required to achieve a $Sr^{90}$ DF of 200 to 300 if contact time is in excess of one (1) day. The experiments revealed that the $Sr^{90}$ DF on sodium titanate increases with solution contact time and reaches a plateau after 1 to 2 days. Changing the sodium titanate addition from 1.0 g/l to 0.5 g/l reduces the amount of Ti in the glass used for immobilization from 1.8 to 0.9 percent which reduces glass devitrification. As will be shown hereinafter, soluble plutonium is also removed by sodium titanate.

A preferred embodiment of the invention is the use of cross-flow filtration to remove the Cs, Pu and Sr precipitates from the nuclear waste supernate. The cross-flow filtration technique serves to remove the decontaminated supernate solution and to concentrate the K/CsTPB-sodium titanate precipitate-adsorbate. Typically the K/CsTPB-sodium titanate precipitate-adsorbate is concentrated from a 0.6 wt. percent solids slurry to about 10 wt. percent. In cross-flow filtration, a solid-liquid suspension is forced by pressure through the center of a porous stainless steel tube at high linear velocity. The difference in pressure between the inside and outside of the porous tube forces clear liquid to "weep" through the tube wall. (This filtration perpendicular to the flow of the supernate is termed cross-flow filtration.) The suspended solid material is continuously recycled through the tube as a slurry with an increasing concentration of solids. Periodic back-pulsing of the filter tube (e.g., with pressurized air,) is used to minimize pluggage of the filter pores.

The concentrated precipitate-adsorbate slurry preferably is washed of excess soluble salts by a continuous dilution washing technique, although noncontinuous washings can be used. The radionuclides in the washed slurry are then immobilized for longterm disposal. In the preferred continuous dilution washing (CDW) technique a continuous stream of wash water (approximately equal to the clear filtrate withdrawal rate) is mixed with the concentrated precipitate slurry before it goes through the filter.

The process of the invention, which uses a precipitation-adsorption scheme, has the advantage over the prior art using solvent extraction of being intrinsically less complicated. The filtrates obtained have decontamination factors (DFs) which are higher than those of a currently proposed ion exchange flowsheet process for a nuclear waste processing facility. Compared to such ion exchange process, the precipitation-adsorption process of the invention is more flexible, simpler, cheaper, and less sensitive to process variables such as hydroxide and cesium ion concentrations.

The current proposed ion exchange reference process for the Savannah River Plant filters suspended solids from the water-soluble fraction of high-level waste at the Savannah River Plant and then removes cesium-137 and strontium-90 by ion exchange. The radionuclides are periodically eluted off the ion exchange resin columns, combined with the insoluble sludge fraction and suspended solids, and immobilized. In such current proposed process, sand filters are used to reduce the suspended sludge particles in the supernate from 50 ppm to 1 ppm to prevent pluggage and breakthrough of the ion exchange columns.

Reference will now be made in detail to the present preferred embodiment of the invention, an example of which is illustrated in the accompanying drawings.

A BRIEF DESCRIPTION OF THE INVENTION

The accompanying drawings, which are incorporated in and form a part of the specification, illustrate the invention and, together with the description, serve to explain the principles of the invention.

In the drawings:

FIG. 1 is a schematic flow diagram for the precipitation process using the cross-flow filtration system of the invention; and FIG. 2 is a flowsheet of the continuous washing of the precipitate.

DETAILED DESCRIPTION OF THE INVENTION

All parts, percentages, ratios and proportions are on a weight basis unless otherwise stated herein or obvious herefrom to one ordinarily skilled in the art.

Figure 1:
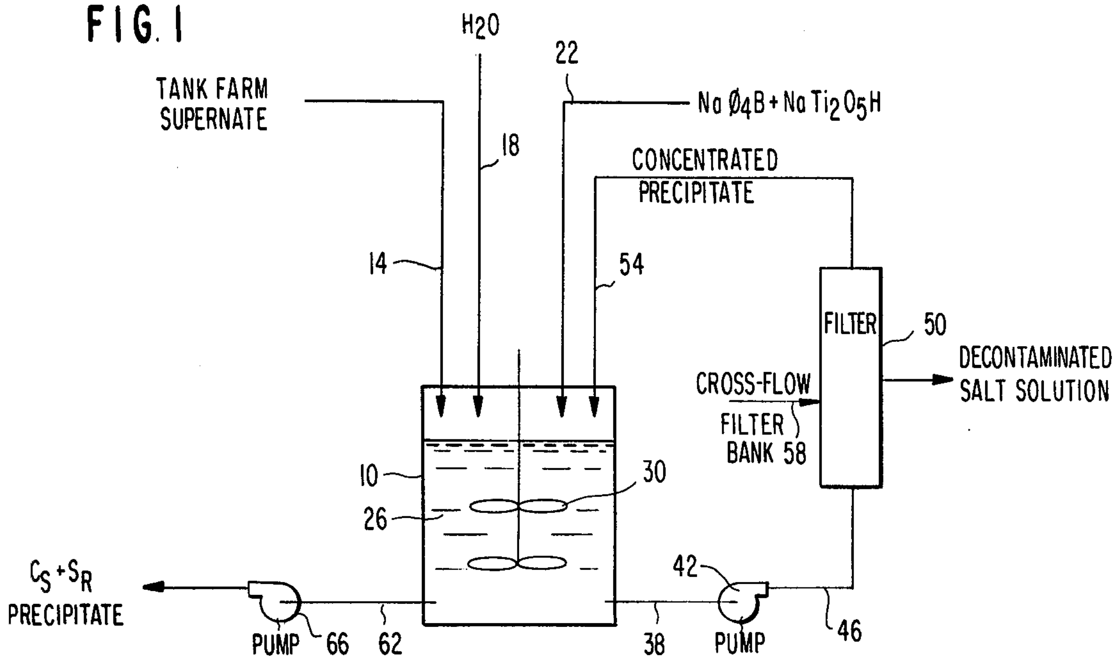

FIG. 1 illustrates the cross-flow filtration system for separating the supernate from the decontaminated supernate. This is a preferred embodiment of the invention. Cesium, plutonium and strontium are efficiently removed from nuclear waste supernate by precipitation with sodium tetraphenyl boron (NaTPB) and sorption on sodium titanate ($NaTi_2O_5H$), respectively. Into tank 10 is inserted nuclear waste supernate via line 14, water via line 18 and sodium tetraphenyl boron and sodium titanate via line 22. Slurry 26 in tank 10 is agitated by means of stirrer 30. Slurry 26 is withdrawn from tank 10 via line 38, pump 42 and line 46 into the bottom of filter 50. Pump 42 is able to develop up to 100 psi and 7 gpm. The volumetric flow rate and pressure can be adjusted independently. Filter 50 is mounted vertically, and is preferably made of sintered stainless steel powder and fabricated in tubular form. (The commercially available filters have pore sizes ranging from 0.2 to 20 micron.) Filter 50 is enclosed in a housing and is available in single tube or multitube configuration. During filtration the pressurized slurry is forced through filter 50 at 3 to 20 ft/sec velocity. The filtrate weeps through filter 50 and is collected in the annular space between filter 50 and its housing. The high linear velocity of the slurry helps sweep the filter surface clean and maintain a high filtrate flux. The slurry is recycled via line 54 to filter 50 until the desired solid concentration is reached. An air pulse approximately 50 psi greater than the slurry pressure is applied via line 58 to the filtrate side every 5 to 10 minutes to backwash filter 50. The back pulse duration is about 0.5 to 2 seconds depending on the size of filter 50. Filter 50 can be chemical cleaned either from the annular side or from the inner side of filter 50. The cesium, plutonium and strontium-bearing concentrate is removed from the bottom of tank 10 via line 62 and pump 66.

The advantages of the cross-flow filtration system for the precipitation process include:

(a) Relatively high DF of greater than $10^5$, and the filtrate flux is 0.2 to 0.4 gpm/ft$^2$;

(b) The filter element is confined within the housing and the potential for contamination is greatly reduced;

(c) It is easy to operate and maintain, the only moving part being the circulation pump; and (d) The stainless steel construction is corrosion and radiation resistant.

Figure 2:
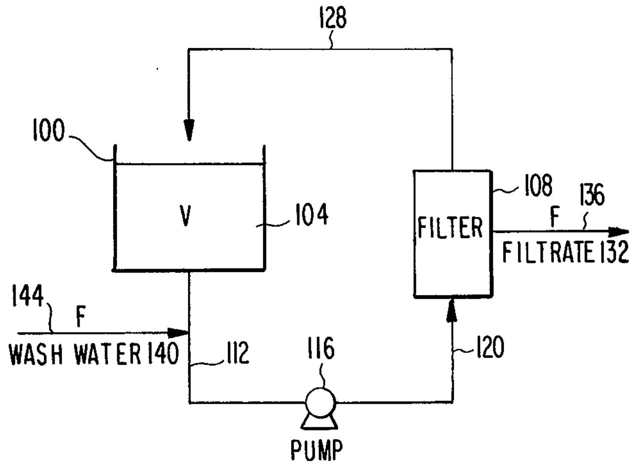

FIG. 2 illustrates the continuous washing of the precipitate-adsorbate (concentrate). Tank 100 holds concentrate 104; V is the volume of concentrate 104. Concentrate 104 is transported to the bottom filter 108 via line 112, pump 116 and line 120. Filtrant 124 is returned to tank 100 via line 128; filtrate 132 exits from filter 108 via line 136. Wash water 140 is continuously injected into line 112 via line 144. (F is the filtrate flow rate or the wash water flow rate.)

As used herein, sodium tetraphenyl boron may be termed NaTPB, cesium tetraphenyl boron may be termed CsTPB, potassium tetraphenyl boron may be termed KTPB.

The highest decontamination factor for cesium reported in the known literature is $8{,}800 \pm 1{,}400$, whereas the preferred embodiment of the invention obtains a decontamination factor in the range of $10^5$ to $10^6$.

The precipitation-adsorption process removes cesium-137, strontium-90 and plutonium from the supernate. It is not necessary to remove ruthenium-106 because its one year half-life causes it to decay to only approximately 47 nCi/ml in the 15 year old waste. The radioactivity of cesium in some of the supernate at the Savannah River Plant is about 4 Ci/gallon even though its concentration is only about $2\times10^{-4}$ M. The goal for decontamination is to reduce its concentration to less than $2\times10^{-8}$ M, i.e., DF$\geqq 1\times10^4$. A DF$\geqq 10^5$ can be achieved from cesium when it is precipitated as cesium tetraphenyl boron. The tetraphenyl boron anion required for cesium precipitation is furnished by sodium tetraphenyl boron (NaTPB) which is highly water soluble. The water solubility of NaTPB is approximately 0.9 M at room temperature—see H. Flaschka and A. J. Barnard, Jr., "Tetraphenylboron (TPB) as an Analytical Reagent," Advances in Analytical Chemistry and Instrumentation, Volume I, (1960). The supernate contains about 0.015 M of potassium which is coprecipitated as potassium tetraphenyl boron.

Strontium in some of the supernate at the Savannah River Plant is in the soluble form and its concentration is about $5\times10^{-7}$ M. A strontium DF of 200 to 300 can be obtained by contacting 0.5 grams of sodium titanate ($NaTi_2O_5H$) with one liter of supernate for 3 days. This amount of sodium titanate is equivalent to 1 percent $TiO_2$ in glass. Soluble plutonium is also removed by sodium titanate in the treatment. Typically the soluble plutonium is reduced from approximately $10^3$ to $10^2$ d/m/ml.

Cesium tetraphenyl boron and potassium tetraphenyl boron are high insoluble (being $10^7$ less soluble than sodium tetraphenyl boron). Sodium titanate (powder) is insoluble.

There are a number of compounds derived from sodium triphenyl boron (NaTPB) which are known to precipitate cesium. M. Meisters, C. E. Moore and F. P. Cassaretto, "Study in the Tetraarylborates—Part 4," Anal. Chim. Acta, Volume 44, p. 287 (1969); J. T. Vandeberg, C. E. Moore, F. P. Cassaretto, and H. Posvic, "Study in the Tetraphenylborate—Part 3," Anal. Chim. Acta., Volume 44, p. 175 (1969); C. E. Moore, F. P. Cassaretto, H. Posvic, and J. J. McLafferty, "Part 2," Anal. Chim. Acta., Volume 35, p. 1 (1966); and A. Bauman, "Gavimetric Determination of Cesium and Potassium with Sodium Triphenyl Cyanoborate," Talanta, Volume 15, p. 185 (1968). The solubility of these cesium triphenyl boron (CsTPB) derived salts can be made smaller or greater than the CsTPB depending on how the TPB anion is modified. For example, attachment of electron releasing groups, such as, alkyl groups, to the benzene rings tends to reduce the solubility so that even its sodium salt becomes water insoluble. The effect of adding electron attracting groups, such as -F or -$CF_3$, produces just the opposite effect.

Sodium triphenylcyano boron (NaTPCB) has been used in the art for precipitating cesium while leaving potassium in the solution, A. Bauman, ibid. This would appear at first to be a significant improvement over NaTPB because the amount of potassium and organic input to the melter could be reduced by approximately 98 percent. However, upon testing NaTPCB on a high-level (Cs) supernate (in conjunction with the invention), the results were disappointing. The cesium decontamination factor (DF) was less than 100 even when a huge NaTPCB excess was used.

EXAMPLE 1

Examples 1 to 4 were run using batch filtration on the above-described high-level nuclear waste supernates in order to decontaminate them of cesium. Specifically, in the supernate feed compositions the sodium ion ranged from 2.8 M to 6.2 M, the hydroxide content ranged from 1 M to 3.8 M, and the cesium radioactivity ranged from 0.08 Ci/gal to 4 Ci/gal.

In Examples 1 to 4, the precipitant used for cesium was 0.5 M sodium tetraphenyl boron solution in 0.01 M sodium hydroxide; the sodium titanate was prepared in slurry form at a concentration of 67 grams per liter; the required amount of sodium tetraphenyl boron and sodium titanate was combined and added to the supernate; the resulting mixture was stirred and then filtered; and the radioactive portion was retained as filter cake and the decontaminated salt solution was separated from the mixture as filtrate.

The effect of several experiment conditions on cesium removal via NaTPB precipitation are set out in Examples 1 to 4. The variables and their ranges studied were: (1) supernate feed compositions; (2) sodium tetraphenyl boron excess and contact time; (3) effect of sodium oxalate; and (4) purity of sodium tetraphenylboron.

The effect of the range of the supernate feed compositions on cesium removal via TaTPB precipitation was tested in Example 1.

The cesium DF was affected most strongly by the sodium concentration. (DF is the decontamination factor.) The concentration of sodium hydroxide and the radioactivity of cesium only had a minor effect on cesium DF. High cesium DF ($>10^5$) was always obtained when the supernate contained <4.5 M sodium ion—see Table 1 below. (Tables 2 and 3 below give the composition of the supernates of Tank 13H and 31H, respectively. The other supernates are set out in the examples below.) When supernate containing more than 4.5 M of sodium was used, the cesium DF was often low and sometimes high. This unfavorable effect of high sodium concentration resulted because most of the tetraphenyl boron anions added were precipitated by sodium and were not available for cesium precipitation. This reasoning agreed very well with the fact that the NaTPB solubility decreased from about 0.9 M in water to 0.0011 M in supernate containing 7 M sodium—see Table 4 below. Further evaluation revealed that a high cesium DF could be obtained if enough excess NaTPB was added and a longer contact time was allowed.

TABLE 1

Effect Of Sodium Concentration On Cesium DF

| $Na^+$ | $OH^-$ | Precipitation Temperature | Cs-137 Feed | Cs-137 Filtrate | Cs-137 DF |
|---|---|---|---|---|---|
| 6.2M(2) | 3.9M | 30° C. | $3.62 \times 10^9$ | $2.26 \times 10^7$ | 160 |
| 5.6M(3) | 2.2M | 30° C. | $2.2 \times 10^9$ | $5.0 \times 10^3$ | $4.4 \times 10^5$ |
| 4.5M(4) | 1.0M | 30° C. | $7.0 \times 10^7$ | $1.83 \times 10^2$ | $3.8 \times 10^5$ |
| 4.5M(4) | 1.0M | 70° C. | $7.0 \times 10^7$ | $<5 \times 10^2$ | $>1.4 \times 10^5$ |
| 3.1M(5) | 1.9M | 30° C. | $1.81 \times 10^9$ | ND(1) | $>3.6 \times 10^6$ |
| 1.8M(6) | 0.9M | 30° C. | $1.2 \times 10^9$ | ND(1) | $>2.4 \times 10^6$ |

Notes:
(1)ND is nondetectable, $<5 \times 10^2$ d/m/ml.
(2)The source of the supernate feed is Tank 31H (50 percent dilution).
(3)The source of the supernate feed is Tank 13H (50 percent dilution).
(4)The source of the supernate feed is Tank 19 F.
(5)The source of the supernate feed is Tank 31H (75 percent dilution).
(6)The source of the supernate feed is the same as note (2) above diluted 2 parts of water to 1 part of slurry.

TABLE 2

Composition Of Tank 13H Supernate

| | | | |
|---|---|---|---|
| A. Major Radioactive Isotopes: | | | |
| Cs-137 | $4.40 \times 10^9$ | d/m/ml | |
| Sr-90 | $7.30 \times 10^6$ | " | |
| Ru-106 | $7.0 \times 10^6$ | " | |
| Tc-99 | $1.1 \times 10^6$ | " | |
| Pu | $1.1 \times 10^5$ | " | |
| B. Chemical Composition: | | | |
| $Na^+$ | 11.22M | $NO_2^-$ | 0.63M |
| $NO_3^-$ | 0.86M | $CO_3^=$ | 0.1M |
| $AlO_2^-$ | 0.90M | $FeO_2^-$ | $5.2 \times 10^{-4}$M |
| $OH^-$ | 4.44M | $PO_4^{-3}$ | $5.0 \times 10^{-4}$M |
| $K^+$ | 0.066M | | |
| $SO_4^=$ | 0.013M | sp. gr. | 1.442 |

TABLE 3

Composition Of Tank 31H Supernate

| | | | |
|---|---|---|---|
| A. Major Radioactive Isotopes: | | | |
| Cs-137 | $7.23 \times 10^9$ | d/m/ml | |
| Sr-90 | $2.10 \times 10^6$ | " | |
| Ru-106 | $1.80 \times 10^6$ | " | |
| Tc-99 | $2.18 \times 10^6$ | " | |
| Pu | $4.0 \times 10^4$ | " | |
| B. Chemical Composition: | | | |
| $Na^+$ | 12.33M | $NO_2^-$ | 1.47M |
| $NO_3^-$ | 1.06M | $CO_3^=$ | 0.10M |
| $AlO_2^-$ | 1.38M | $FeO_3^-$ | $5.3 \times 10^{-4}$M |
| $OH^-$ | 7.30M | $PO_4^{-3}$ | 0.012M |
| $K^+$ | 0.11M | | |
| $SO_4^=$ | 0.13M | sp. gr. | 1.503 |

TABLE 4

Solubility Of Sodium Tetraphenyl Boron As A Function Of Sodium Concentration

| Sodium In Molar | Solubility(1) Of Sodium Tetraphenyl Boron In Molar |
|---|---|
| 0M | 0.80M |
| 2.5M | 0.032M |
| 4.0M | 0.0065M |
| 5.5M | 0.0018M |
| 7.0M | 0.0011M |

Note:
(1)Measured by Plasma Source Emission Spectroscopy (ICP) at room temperature.

EXAMPLE 2

The effect of NaTPB excess and contact time on cesium removal via NaTPB precipitation was tested in Example 2.

The control of sodium concentration in the supernate was very important to the precipitation process because the TPB anions were precipitated when sodium concentration was too high. As a result, the NaTPB excess had to be increased to obtain a high cesium DF. The effect of NaTBP excess on cesium DF for a supernate containing 5.3 M $Na^+$ is given in Table 5 below. (The composition of the feed or supernate used is given in Table 6 below). Cesium DF's greater than $10^5$ were obtained when the NaTPB excess was 0.025 M or greater.

Beside the $Na^+$ concentration in the solution, the contact time was found to be important for achieving high cesium DF's. This effect was clearly seen when the NaTPB excess was insufficient and the contact time was less than 2 hours. Table 7 below indicates that, at 4.3 M of sodium and 0.012 M of NaTPB excess, the cesium DF increased from 18 to greater than $1.1 \times 10^5$ in four days (no stirring) and reached a constant value of $>3.3 \times 10^5$ after 11 days. The improvement of cesium DF with time was believed to be caused by the exchange of ions between the NaTPB precipitate and cesium ions in the supernate until their dynamic equilibrium was reached. Longer times were required for reaching high cesium DF's when the sodium level was high because by nature the ion exchange process (described elsewhere herein) was much slower than the precipitation process.

Typical cesium decontamination factors as a function of sodium tetraphenyl boron are given in Table 8 below.

TABLE 5

| | Effect Of NaTPB[1] Excess On Cs DF[2] [3] | | |
|---|---|---|---|
| $Na^+$ | NaTPB Excess | Cesium In Filtrate | Cesium DF |
| 5.3M | 0.02M | $2.51 \times 10^7$ d/m/ml | 89 |
| 5.3M | 0.025M | $<2 \times 10^4$[4] | $>1.12 \times 10^5$ |
| 5.3M | 0.035M | $<1.8 \times 10^4$[4] | $>1.24 \times 10^5$ |
| 5.3M | 0.040M | $<1.4 \times 10^4$[4] | $>1.60 \times 10^5$ |

Notes:
[1]NaTPB is sodium tetraphenyl boron.
[2]The feed was $2.24 \times 10^9$ dpm/ml in cesium and .0335M in potassium (Tank 37H), two hours contact time.
[3]DF is the decontamination factor.
[4]Precise cesium-137 levels could not be obtained because of Ru-106 interference.

TABLE 6

Composition Of Tank 37H

| | | | |
|---|---|---|---|
| A. Major Radioactive Isotopes: | | | |
| Cs-137 | $5.0 \times 10^9$ | | d/m/ml |
| Sr-90 | $2.10 \times 10^7$ | | " |
| Ru-106 | $1.66 \times 10^7$ | | " |
| Tc-99 | $1.90 \times 10^6$ | | " |
| Pu | $1.60 \times 10^5$ | | " |
| B. Chemical Composition: | | | |
| $Na^+$ | 10.6M | $NO_2^-$ | 2.1M |
| $NO_3^-$ | 1.75M | $CO_3^=$ | 0.02M |
| $AlO_2^-$ | 0.1M | $FeO_2^-$ | $2 \times 10^{-4}$M |
| $OH^-$ | 4.75M | $PO_4^{-3}$ | 0.014M |
| $K^+$ | 0.06M | $Cs^+$ | $5.99 \times 10^{-4}$ |
| $SO_4^=$ | 0.02M | sp. gr. | 1.424 |

TABLE 7

| | Effect Of Contact Time On Cesium DF | | |
|---|---|---|---|
| $Na^+$ | NaTPB Excess | Contact Time | Cesium DF |
| 4.3M | 0.012M | 2 hours | 18 |
| 4.3M | 0.012M | 1 day | 107 |
| 4.3M | 0.012M | 4 days | $>1.1 \times 10^5$ |
| 4.3M | 0.012M | 11 days | $>3.3 \times 10^5$ |
| 4.3M | 0.012M | 15 days | $>3.3 \times 10^5$ |

TABLE 8

| Cesium DF As A Function Of NaTPB Excess | | | |
|---|---|---|---|
| NaTPB Excess | Cesium d/m/ml | Cesium DF | Source Supernate Feed |
| — | $7 \times 10^7$ | — | Tank 19F |
| .008M | 229 | $3.1 \times 10^5$ | Tank 19F |
| .012M | 183 | $3.8 \times 10^5$ | Tank 19F |
| .042M | 347 | $2.0 \times 10^5$ | Tank 19F |

EXAMPLE 3

The effect of sodium oxalate on cesium removal via NaTPB precipitation was tested in Example 3.

The Savannah River Plant of the Department of Energy currently has stored high level radioactive waste in tanks that are nearing the end of their useful life. Before a new waste processing facility can be constructed, the high level waste in the old tanks will be removed and stored in the newly constructed waste tanks. During the transfer of wastes, some waste will be left behind because not all waste sludge can be removed by slurry pumping alone. The residual waste sludge can be dissolved in oxalic acid. The waste tank cleaning will generate about 600 tons of sodium oxalate in addition to 400 tons which is expected to be in the waste tanks. If this sodium oxalate is uniformly distributed in 55 million gallons of supernate, its concentration will be approximately 0.036 M. The solubility of sodium oxalate is 0.26 M in water and about 0.0134 M in supernate containing 5.3 M of sodium. Therefore, without a destruction step, the sodium oxalate will precipitate in the supernate.

The sodium oxalate precipitation is not compatible with a waste processing method using an ion exchange process, where the sodium oxalate precipitate is removed at the sand filter. When the sand filter is backwashed, the retained sodium oxalate is recycled to the supernate feed tank. As a result the sodium oxalate precipitate would accumulate in a close loop between the sand filter and the supernate feed tank. The buildup of undissolved sodium oxalate would make sand filter ineffective and eventually lead to breakdown of the waste processing operation.

However, when the precipitation process of the invention is used for the supernate treatment, the undissolved sodium oxalate together with potassium/cesium tetraphenyl boron (K/CSTPB) and sodium titanate are removed from the decontaminated supernate at the cross-flow filter. In a test the entire solid concentrate was then washed to reduce sodium concentration from about 5.3 M to 0.225 M. The purpose of washing is to insure that the precipitate would contribute no more than 1 percent of sodium to the vitrified glass in final storage containers. After separated from the radioactive CSTPB, KTPB, and sodium titanate, the wash solution was evaporated and solidified in the saltcrete.

Several experiments were run using actual supernate from Tank 37. The purpose of these tests was to confirm that the undissolved sodium oxalate does not have uny undesirable effects on filtration rate and decontamination factor. In these tests, up to 11 times the anticipated amount of sodium oxalate were added into the supernate. Visual observations revealed that the undissolved sodium oxalate did not produce noticeable changes in the filtrate flow rate. The radioactivities of Cs-137 and Sr-90 were measured and the results are summarized in Table 9 below. The results indicated that the presence of undissolved sodium oxalate did not affect the DF for Cs-137 and Sr-90. The presence of sodium oxalate did not adversely affect the performance of cross-flow filtration (0.2 to 0.4 gpm/ft$^2$). An oxalic acid destruction step is not necessary when the new precipitation process of the invention is used.

TABLE 9

| Effects Of Sodium Oxalate On DF OF Cs And Sr | | | | |
|---|---|---|---|---|
| $Na_2C_2O_4$[1] | Cesium-137[2] | | Strontium-90[2] | |
| Addition | Radioactivity | DF | Radioactivity | DF |
| 0M | $<5 \times 10^3$ | $>4.5 \times 10^5$ | $2.7 \times 10^4$ | 296 |
| 0.042M | $<5.2 \times 10^3$ | $>4.3 \times 10^5$ | $8.1 \times 10^4$ | 99 |
| 0.087M | $1.29 \times 10^4$ | $1.7 \times 10^5$ | $4.1 \times 10^4$ | 195 |
| 0.191M | $9.59 \times 10^3$ | $2.3 \times 10^5$ | $3.1 \times 10^4$ | 258 |
| 0.417M | $1.20 \times 10^4$ | $1.9 \times 10^5$ | $6.8 \times 10^3$ | 1176 |

Notes:
[1]The average sodium oxalate is 0.036M with no oxalic acid destruction.
[2]Radioactivities in the feed:
Cs-137 = $2.24 \times 10^9$ d/m/ml
Sr-90 = $8.0 \times 10^6$ d/m/ml

EXAMPLE 4

The purity of NaTPB required on cesium removal via NaTPB precipitation was tested in Example 4. NaTPB of >99 percent purity is preferred. However, a purity of 97 percent for the NaTPB is certainly sufficient within the scope of the invention. 97 percent NaTPB was tested with high level nuclear waste supernate (using actual Savannah River Plant waste) to see if acceptable DF/s could be obtained for cesium. Table 10 below gives the results of testing using high level nuclear waste supernate. The performance of 97 percent pure NaTPB was acceptable because it gave DF's $>10^4$. Some of the NaTPB recovered from the aqueous waste stream at the Sabine River Plant (Department of Energy) was also evaluated. The test results are given in Table 10 below and indicated that even the recovered NaTPB gave DF's $>10^4$.

TABLE 10

Effect of Na—TPB Impurity On Cesium Decontamination

| Item | Feed Na | Feed $K^+$ | Feed $Cs^+$ | Na—TPB Excess | Filtrate $Cs^+$ | Filtrate DF |
|---|---|---|---|---|---|---|
| JBT-4[(1)] | 4.84M | 0.066M | $2.51\times10^8$ | 0.015M | $8.75\times10^3$ | $2.87\times10^4$ |
| JBT-5 | 4.84M | 0.066M | $2.51\times10^8$ | 0.020M | $9.52\times10^3$ | $2.63\times10^4$ |
| JBT-6 | 4.84M | 0.066M | $2.51\times10^8$ | 0.025M | $7.99\times10^3$ | $3.14\times10^4$ |
| JBT-7 | 5.00M | 0.02M | $9.50\times10^7$ | 0.02M | $4.73\times10^3$ | $2.0\times10^4$ |
| JBT-8 | 5.00M | 0.02M | $9.50\times10^7$ | 0.025M | $3.57\times10^3$ | $2.66\times10^4$ |
| JBT-9[(2)] | 5.00M | 0.02M | $9.50\times10^7$ | 0.030M | $5.06\times10^4$ | $1.88\times10^3$ |
| Raylo-1[(1)] | 5.00M | 0.02 | $9.50\times10^7$ | 0.02M | $2.93\times10^3$ | $3.24\times10^3$ |
| Raylo-2 | 5.00M | 0.02 | $9.50\times10^7$ | 0.025M | $3.35\times10^3$ | $2.84\times10^4$ |
| Raylo-3 | 5.00M | 0.02 | $9.50\times10^7$ | 0.030M | $3.06\times10^3$ | $3.10\times10^4$ |

Notes:
(1)The NaTPB used in the JBT series was recovered from the waste stream at Sabine Plant. The NaTPB used in the Raylo series was 97 percent pure made by Raylo.
(2)The low DF for this sample was because the sample was contaminated during handling.

EXAMPLE 5

This example involves decontaminating high level nuclear waste supernate of strontium.

Most of the strontium fission product was in the sludge described in Example 3 and existed as strontium hydroxide. Only soluble strontium stayed in the supernate and its concentration was about $5\times10^{-7}$ M. Strontium DFs of 200 to 300 were obtained by adding 0.5 grams of sodium titanate to every liter of supernate, which is equivalent to 1 percent $TiO_2$ in the glass. The DFs of strontium as a function of sodium titanate added are given in Table 11 below. Since the adsorption of strontium is an ion exchange process, one would have expected that the DF would be contact time dependent. Table 12 below gives the strontium DFs as a function of contact time at sodium titanate equivalent to 1 percent $TiO_2$ in glass. Based on these results, it was concluded that at least two days contact time was required at sodium titanate level equivalent to 1 percent $TiO_2$ in glass.

The adsorption of strontium should be carried out in a stored tank instead of using an ion exchange column for the following reasons: sodium titanate slurry can be mixed with sodium tetraphenyl boron solution so that cesium and strontium can be removed in one operation; the disposal of the used sodium titanate in the column is avoided; and a better balance between the high capacity and kinetics of strontium adsorption is achieved.

TABLE 11

Removal Of Strontium Via Sodium Titanate Adsorption

| Test No. | Na—Titanate % $TiO_2$ In Glass | Strontium-90 Feed | Strontium-90 Filtrate | Strontium-90 DF |
|---|---|---|---|---|
| 1 | 1.3 | $8.0\times10^6$ | $1.48\times10^4$ | 541 |
| 2 | 1.3 | $1.1\times10^7$ | $4.08\times10^4$ | 270 |
| 3 | 0.5 | $8.0\times10^6$ | $2.50\times10^5$ | 32 |
| 4 | 1.0 | $1.6\times10^6$ | $7.6\times10^3$ | 210 |
| 5 | 1.0 | $1.6\times10^6$ | $1.1\times10^4$ | 145 |
| 6 | 1.0 | $1.6\times10^6$ | $7.5\times10^3$ | 213 |
| 7 | 1.0 | $1.6\times10^6$ | $6.8\times10^3$ | 235 |

TABLE 12

Strontium Decontamination Vs. Contact Time

| Item | Sodium Titanate % $TiO_2$ In Glass | Contact Time | Sr-90 d/m/ml | Sr-90[(1)] DF |
|---|---|---|---|---|
| Feed | 0 | — | $8.7\times10^6$ | — |
| T-1 | 1 | 2 hrs | $9.8\times10^4$ | 89 |
| T-2 | 1 | 1 day | $1.3\times10^4$ | 669 |
| T-3 | 1 | 4 days | $1.5\times10^4$ | 580 |
| T-4 | 1 | 11 days | $2.4\times10^4$ | 363 |

Notes:
(1)The average DF after 1 day is about 500 ± 200. The data spread was caused by analytical uncertainty in Sr-90 measurements.

EXAMPLE 6

This example involves decontaminating high level nuclear waste supernate of plutonium.

Most of the plutonium fission product was in the sludge described in Example 3. However, small amounts of plutonium were detected in the supernate in both soluble and insoluble form. Some very fine dark brown particles were observed in the plutonium analysis of the supernate of Tank 18. The particles were separated and plutonium analyses were made for both the liquid and solid portions, with the results thereof given in Table 13 below. The solid portion contained approximately 580 times more Pu than the liquid portion. This result was in agreement with the Pu data for the supernate of Tank 19F before and after sand filtration—see Table 13 below.

Several experiments were run to measure the plutonium DF in the precipitation process, and the results are given in Table 14 below. Such test data indicates that the plutonium in the filtrate was in approximately the $10^2$ d/m/ml range.

The solubility of plutonium in water decreases as pH increases and reaches a minimum at pH 12.0. The solubility of plutonium in water increases about 50 times when the pH is increased to 13.5. Several tests were run to evaluate how effectively plutonium can be adsorbed on sodium titanate. Table 15 below gives the DF of plutonium as a function of contact time. Any increase in DF as the contact time increases was a direct measurement of adsorption of soluble plutonium by sodium titanate. The plutonium in test No. 1 was mostly insoluble (1.1 M $OH^-$). Therefore, its radioactivity was reduced from $1.23\times10^4$ to $3.48\times10^2$ d/m/ml by simple filftration. The significant fraction of plutonium in test Nos. 2 to 9 was in soluble form (1.7 to 2.0 M $OH^-$). The plutonium DF for the supernates containing higher soluble plutonium increased about 10 times if enough contact time was allowed for adsorption of soluble plutonium. In all cases, the final plutonium radioactivities were reduced to $10^2$ d/m/ml, which was the detection limit for plutonium in supernate.

TABLE 13

Plutonium Concentration Distributions In Supernates

| Supernate | Pu d/m/ml Solid | Pu d/m/ml Liquid | Pu d/m/ml Before Filtration | Pu d/m/ml After Filtration |
|---|---|---|---|---|
| Tank 18 | $3.8 \times 10^5$ | $6.2 \times 10^2$ | — | — |
| Tank 19F | — | — | $1.23 \times 10^4$ | $5 \times 10^2$ |

TABLE 14

Plutonium DF During Filtration Of Cs And Sr Precipitate

| Item | Pu d/m/ml Feed | Pu d/m/ml Filtrate | Pu DF | Filtration Stages |
|---|---|---|---|---|
| P-2 | $3.2 \times 10^4$ | $7.2 \times 10^2$ | 40 | One |
| Q-2 | $8 \times 10^4$ | $4.4 \times 10^2$ | 149 | Two |
| Q-4 | $6.4 \times 10^4$ | $3.6 \times 10^2$ | 145 | Two |

TABLE 15

Removal Of Plutonium In The Precipitation Process

| Test # | $OH^-$ | Contact Time | Plutonium d/m/ml Feed | Plutonium d/m/ml Filtrate | Plutonium DF |
|---|---|---|---|---|---|
| 1 | 1.1M | 0 (Simple Filtration) | $1.23 \times 10^4$ | 120 | 103 |
| 2 | 2.0M | 2 Hours | $5.34 \times 10^4$ | $4.17 \times 10^3$ | 13 |
| 3 | 2.0M | 1 Day | $5.34 \times 10^4$ | $9.18 \times 10^2$ | 58 |
| 4 | 2.0M | 4 Days | $5.34 \times 10^4$ | $1.25 \times 10^2$ | 427 |
| 5 | 2.0M | 11 Days | $5.34 \times 10^4$ | $1.44 \times 10^2$ | 370 |
| 6 | 1.7M | 3 Hours | $4.01 \times 10^4$ | $1.32 \times 10^3$ | 30 |
| 7 | 1.7M | 4 Days | $4.01 \times 10^4$ | $1.92 \times 10^2$ | 209 |
| 8 | 1.7M | 11 Days | $4.01 \times 10^4$ | $2.34 \times 10^2$ | 171 |
| 9 | 1.7M | 15 Days | $4.01 \times 10^4$ | $2.13 \times 10^2$ | 188 |
| 10 | — | 22 Days | $1.42 \times 10^4$ | $1.25 \times 10^2$ | 114 |

TABLE 16

Composition Of Tank 19F Dissolved Salt Solution

| | | | |
|---|---|---|---|
| A. Major Radioactive Isotopes: | | | |
| Cs-137 | $7 \times 10^7$ | | d/m/ml |
| Sr-90 | $1 \times 10^5$ | | " |
| Ru-106 | $1 \times 10^4$ | | " |
| Tc-99 | $3.2 \times 10^4$ | | " |
| Pu | $\sim 10^3$ | | |
| B. Chemical Composition: | | | |
| $Na^+$ | 4.5M | $SO_4^=$ | 0.2M |
| $NO_3^-$ | 2.7M | $NO_2^-$ | 0.1M |
| $AlO_2^-$ | 0.4M | $CO_3^=$ | 0.1M |
| $OH^-$ | 1.1M | $F^-$ | 0.023M |
| $D^+$ | 0.015M | $Cl^-$ | 0.005M |
| $C_2O_4^=$ | $2 \times 10^{-3}$M | $I^-$ | <7 ppm |

TABLE 17

Radiation And Chemical Stability Of CsTPB(1)

| Item | Days Since Precipitation | Cs-137 d/m/ml | Cs-137 DF |
|---|---|---|---|
| Feed | — | $4.4 \times 10^7$ | — |
| A-2 | 12 | ND | $4.4 \times 10^5$ |
| A-3 | 26 | $3.46 \times 10^2$ | $1.3 \times 10^5$ |
| A-4 | 42 | $1.0 \times 10^2$ | $4.4 \times 10^5$ |
| A-5 | 56 | $2.8 \times 10^3$ | $1.6 \times 10^4$ |
| A-6 | 69 | $1.19 \times 10^3$ | $3.7 \times 10^4$ |
| A-7 | 88 | ND(3) | $4.4 \times 10^5$ |
| A-8 | 120 | ND(3) | $4.4 \times 10^5$ |
| A-9 | 142 | $2.7 \times 10^3$ | $1.6 \times 10^4$ |
| A-9A | 154 | $2.4 \times 10^5$ | $1.8 \times 10^3$(2) |
| A-10 | 161 | $4.2 \times 10^3$ | $1.0 \times 10^4$ |
| A-11 | 191 | $<3.7 \times 10^3$ | $>1.2 \times 10^4$ |
| A-12 | 225 | $5.2 \times 10^2$ | $8.5 \times 10^4$ |
| A-13 | 245 | $1.8 \times 10^3$ | $2.4 \times 10^4$ |
| A-14 | 286 | $6.8 \times 10^2$ | $6.5 \times 10^4$ |
| A-15 | 344 | $1.9 \times 10^2$ | $2.3 \times 10^5$ |
| A-16 | 389 | $4.5 \times 10^2$ | $9.8 \times 10^4$ |

Notes:
(1)Initial Na—TPB excess was 0.013M.
(2)The low DF as caused by sample contamination.
(3)ND is nondetectable - approximately 100 d/m/ml (detection limit) for Tank 19F solutions.

EXAMPLE 7

This example involves the chemical and radiation stability of cesium tetraphenyl boron.

Since the precipitation used in the invention is simple and can be carried out directly inside the waste tank, the in-tank decontamination of the invention elminates the expensive canyon building and results in the savings of huge capital investment. To make in-tank decontamination possible, the precipitate has to be stable in the waste tank for at least one month. Therefore, the radiation and chemical stability of the precipitate was evaluated using the actual supernate from Tank 19F. (The composition of Tank 19F is given in Table 16 below.) The results for up to 389 days of storage are given in Table 17 below, which indicate that no significant amount of Cs-TPB was decomposed during this period. The cesium DF at the end of 389 days storage was $9.8 \times 10^4$ (exceeding the $1 \times 10^4$ goal).

The radiation stability of a water washed potassium/cesium tetraphenyl boron (K/CsTPB) precipitate was measured. The spiked (Cs-137) precipitate was prepared in supernate, filtered, washed with 0.01 M NaOH, dispersed in water, irradiated (Co-60 at $5.8 \times 10^6$ rad/hr), and refiltered. Then the filtrate activity was used to measure the radiation stability constant. An extremely low radiation stability constant of 0.0044 molecules/100 ev was observed. (This is equivalent to $4.6 \times 10^{-12}$ moles/rad.)

EXAMPLE 8

This example illustrates the effect of the circulation pump on the filtrate flux in the cross-flow filtration system.

Using the scheme of FIG. 1, a set of exploratory filtration tests were run using a centrifugal pump for slurry circulation. The filtrate flux was about 0.1 gpm/ft$^2$ at 30 psi for 0.5 micron filter. The filtrate flux was reduced to 0.06 gpm/ft$^2$ when the agitator in the feed tank was turned on. This observation suggested that the precipitate was quite shear sensitive. Visual inspection showed that the precipitate tended to form aggregates which could readily be dispersed by stirring—however, upon standing for a few minutes, the precipitate returned to the aggregate form. With these observations in mind, an air-driven diaphragm pump was chosen for slurry circulation because of its gentle action on the slurry. As expected, the filtrate flux was increased from 0.1 to 0.3 gpm/ft$^2$ after the pump change. A synthetic supernate (4.3 M Na+), containing cesium/potassium tetraphenyl boron and sodium titanate was used. The total undissolved solid was about 1 percent. The filtrate flux for this mixture was $0.3 \pm 0.03$ gpm/ft$^2$ during a continuous 48 hour test. The filtrate flow rate was about 3 times higher than the results when the centrifugal pump was used. Apparently the improvement was because the diaphragm pump did not break apart the precipitate aggregates as much as the centrifugal pump, therefore, the filter did not plug as much. At the end of the test the filter was flushed with process water from outside in for about 20 seconds. The filtrate flux was raised to 0.3 gpm/ft$^2$. The unit performed extremely well during the test and no adjustments or maintenance were required. No problems were encountered during startup after novernight shutdown.

An air-operated diaphragm pump which can develop the required discharge pressure at slow flow rate has the main advantage of exerting gentle action on the slurry and helping to maintain the solid particles in aggregates. The air does not contact the liquid being pumped, and it makes remote operation easier.

EXAMPLE 9

This example involves a filtration evaluation test using the cross-flow system.

Using the scheme of FIG. 1 and the pump of Example 8, a supernate (4.3 M $Na^+$) containing CsTPB, KTPB and sodium titanate was prepared which contained about 1 percent of insolubles. The filtration conditions were: (a) the average slurry pressure was 39 psi and the velocity was 11 ft/sec; (b) the air pulse pressure was 90 psi, the frequency was 8 $min^{-1}$ and the duration was 0.8 seconds; (c) the water pressure was 48 psi for filter cleaning; and (d) the filter pore size was 0.5 micron. The filtrate flux was 0.3±0.03 gpm/ft$^2$ during the 48 hour test. The results are given in Table 18 below. At the end of the test the filter was flushed with process water from outside in for 20 seconds and the filtrate flux was raised to 0.3 gpm/ft$^2$—see Table 18 below. The unit performed extremely well during the test and no adjustment or maintenance was required. No problems were encountered during startup after any overnight shutdown.

TABLE 18

| Time | Filtrate Flux vs. Time<br>Rotameter Reading | Filtrate Flux gpm/ft$^2$ |
|---|---|---|
| 11/9 08:30 | 7.3 | — |
| 15:30 | 7.4 | 0.325 |
| 21:55 | 7.4 | — |
| 11/10 04:00 | 7.3 | — |
| 08:00 | 7.3 | 0.316 |
| 14:00 | 7.2 | 0.300 |
| 20:05 | 7.4 | — |
| 11/11 00:35 | 7.0 | 0.268 |
| 03:45 | 6.9 | 0.284 |
| 08:30 | 6.8 | 0.272 |

EXAMPLE 10

This example illustrates filtration of the sludge alone.

A synthetic supernate containing 400 ppm (8 times more than the anticipated value) of sludges were successfully filtered using continuous corss-flow filters. The filtrate flux during the first 4 hours of operation was 0.11±0.01 gpm/ft$^2$. The filtrate flux remained unchanged after shutdown over a weekend with sludge concentrate remaining in the system. At the end of the sludge filtration test, the filter was cleaned simply by flushing water through the filter from the outside for about 20 seconds. The test conditions were the same as the supernate test of Example 9 except that the air pulse pressure was 70 psi, the frequency was 5 $min^{-1}$ and the duration was 0.5 seconds. The test results based on HIAC analyses were:

The solids in filtrate (0.5 micron filter) were 0.43 ppm.

The solids in filtrate (2 micron filter) were 5.3 ppm after 1 hour and 1.36 ppm after one day of operation. The filtrate flux after one day operation was about 25 percent higher than the 0.5 micron filter.

The average sludge particle size was 1.9 micron.

There are occasions when the filtration of sludge alone is required. For example, in the current waste processing facility, Cs-100 ion exchange, sand filters are used to reduce the suspended sludge particle in the supernate from 50 ppm to 1 ppm to prevent pluggage and breakthrough of the ion exchange columns. These sand filters and associated tanks for feeding and backwashing occupy approximately 40 percent of the canyong space. The use of continuous cross-flow filters instead of said filters would result in a very significant capital savings in the ion exchange process.

EXAMPLE 11

Examples 11 and 12 were run for the evaluation of the prcipitation process and cross-flow filter (removal of the Cs and Sr precipitate).

This example illustrates the decontamination factors for Cs-137, Sr-90 and Pu using the precipitation process of the invention using cross-flow filtration.

The cross-flow filtration system (see FIG. 1) was installed to run tests on the actual high nuclear waste of the Savannah River Plant, Department of Energy. A small-scale cross-flow filtration system using an air-driven diaphragm pump was built and installed in the High Level Caves. The filtrate flow was 0.285 gpm/ft$^2$ at 26 psi pressure drop and 12 ft/sec slurry flow rate. The feed for this test was a blend of 10 percent from Tank 37 and 90 percent from Tank 8. The composition of this feed is given in Table 19 below. In this test, 1281 of 0.5 M NaTPB was used to give a 0.02 M excess, 96 ml of sodium titanate slurry was added to give an equivalent of 1 percent of $TiO_2$ in glass and 550 ml of 1 M oxalic acid was added to give 0.037 M oxalate. The purpose of oxalic acid addition was to verify that an oxalic acid destruction step could be omitted without any undesirable effects on the precipitation process of the invention. The results of this test are given in Table 20 below. The DF for cesium was greater than $10^5$ and the radioactivity for strontium and plutonium was in the range of $10^3$ and $10^2$ d/m/ml, respectively. This result indicated the precipitation is successful and is not affected by the presence of sodium oxalate.

TABLE 19

| Composition Of Supernate For Ppt-1 | |
|---|---|
| $Na^+$ | = 4.84M |
| $K^+$ | = 0.021M |
| Oxalate | = 0.037M |
| Cs-137 | = 7.21 × $10^8$ d/m/ml |
| Ru-106 | = 2.07 × $10^6$ d/m/ml |
| Sb-125 | = 6.06 × $10^4$ d/m/ml |
| Co-60 | = 6.69 × $10^3$ d/m/ml |
| Sr-90 | = 1.60 × $10^6$ d/m/ml |

TABLE 20

| Decontamination Factor For Precipitation Process Using Cross-Flow Filtration | | | | | | |
|---|---|---|---|---|---|---|
| | Cesium-137 d/m/ml | | Strontium-90 | | Plutonium d/m/ml | |
| Test # | Filtrate | DF | Filtrate | DF | Filtrate | DF |
| 1 | <6 × 10³ | >1.2 × 10⁵ | 7.6 × 10³ | 210 | 1.25 × 10² | 65 |
| 2 | <6 × 10³ | >1.2 × 10⁵ | 1.1 × 10⁴ | 145 | 1.86 × 10² | 44 |
| 3 | ND | >1.4 × 10⁶ | 7.5 × 10³ | 213 | 1.72 × 10² | 47 |

EXAMPLE 12

This example involves the variable affecting the filter performance.

As in Example 11, the cross-flow system (see FIG. 1) was installed to run tests on the actual nuclear waste of the Savannah River Plant. The cross-flow filtration system was operated remotely and required almost no attention. The filter was not backwashed with water or chemically cleaned so that the long term filter pluggage could be assessed. The data reported below involved unsteady state operations.

(A) The Filtrate Flux As A Function Of Time

The filtrate flux was reduced from 0.29 gpm/ft$^2$ to 0.23 gpm/ft$^2$ after 7 working days. The process settings were 12 ft/sec slurry flow rate and 26 psi filtration pressure.

The filtrate flux reduced from 0.35 gpm/ft$^2$ (1 percent solids) to 0.19 gpm/ft$^2$ (2 percent solids) in 13 working days. The filtrate flux probably had reached a steady state because no changed was detected in the last 4 days. The process settings were 6.5 ft/sec and 31 psi.

(B) The Effect Of The Slurry Flow Rate On The Filtrate Flux

The effect of slurry flow rate on filtrate flux is given in Table 21 below. The filtrate flux increased from 0.23 to 0.36 gpm/ft$^2$ when the slurry flow was reduced from 12 ft/sec to 6.5 ft/sec. This increase in the filtrate flux occurred because more slurry was in the aggregate state as a result of shear stress reduction in the tubing. The optimal slurry flow for this system was about 6.5 ft/sec which is expected to vary with the size of the mass flow filtration systems.

(C) The Effect Of Shutdowns And Startups

Repeated shutdowns and startups did not affect the performance of the system.

(D) Effect Of The Pulse Frequency And Duration

The pulse frequency and duration do not significantly affect the filtrate flux when they were set at 0.5 sec. pulse/5 min. to 0.8 sec. pulse/8 min. (90 psi air).

(E) Effect Of Pressure On Filtration Flux

A slight increase in the filtrate flux was observed as the filtration process was increased from 26 to 36 psi.

| Filtration Pressure, Psi | Filtration Flux, gpm/ft² |
|---|---|
| 26 | 0.22 |
| 32 | 0.23 |
| 36 | 0.29 |

TABLE 21

| The Effect Of Slurry Flow Rate On Filtrate Flux | |
|---|---|
| Slurry Flow Ft/Sec | Filtrate Flux(1) gpm/ft² |
| 12.0 | 0.23 |
| 7.8 | 0.35 |
| 6.5 | 0.36 |
| 5.2 | 0.33 |
| 3.9 | 0.33 |

Note:
(1)P is 31 psi, 0.5 sec pulse/5 min. Air pressure is 90 psi for backpulsing.

EXAMPLE 13

This example involves the decontamination factor for Barium-137.

The source of all gamma radiation from Cs-137 is actually from the decay of its daughter Ba-137$^m$ (half-life 2.6 minutes). In the precipitation process of the invention the Cs-137 is precipitated by the sodium tetraphenylboron while the Ba-137$^m$ can go into solution if it escapes from the cesium tetraphenyl boron crystals. The soluble Ba-137$^m$ can then pass through the cross-flow filter causing the filtrate to have the same gamma radiation intensity as the original waste supernate for the first few minutes after filtration.

Tests with actual supernate demonstrated that the precipitation process gave a Ba-137$^m$ DF of >3500. The radioactivities of the filtrate as a function of time are given in Table 22 below. A sample of Tank 37H supernate was mixed with sodium tetraphenyl boron and sodium titanate and filtered with a cross-flow filter. The filtrate was analyzed on-line with a Ge(Li) gamma detector. This high Ba-137$^m$ DF meant that quick on-line leak detection could be done in the "in-tank" precipitation processing and eliminated the need for shielded above ground holdup tankage for the filtrate.

TABLE 22

| Barium-137$^m$ Radioactivity In The Filtrate As A Function Of Time | | | | | |
|---|---|---|---|---|---|
| Continuous Flow | | | No Flow Through GeLi Detector | | |
| Time After Filtration | Ba-137$^m$ d/m/ml | DF(1) | Time After Filtrate Flow is Stopped | Ba-137$^m$ d/m/ml | DF(1) |
| 2.5 Min. | 9.76 × 10⁴ | 7.38 × 10³ | 4.27 Min | 2.7 × 10⁴ | 2.67 × 10⁴ |
| 3.0 Min. | 9.23 × 10⁴ | 7.80 × 10³ | 14.73 Min. | 4.88 × 10³ | 1.47 × 10⁵ |
| | | | 18.25 Min. | 3.60 × 10³ | 2.0 × 10⁵ |

Note:
(1)Initial Ba-137$^m$ is 7.2 × 10⁸ assuming all barium dissolved.

EXAMPLE 14

This example involves the effect of concentration of the precipitate.

Twenty-nine liters of high-level nuclear waste supernate containing 4.84 M of sodium was successfully concentrated down to about two liters, the minimum amount of liquid required to fill up the filtration system.

The concentrate contained 38 wt. percent of total solids which was measured by overnight evaporating the concentrate at 115° C. The total insoluble solids was about 17 wt. percent, assuming the concentrate contained 70 percent of liquid and 30 percent of soluble solids. The rheological properties of the concentrate were measured. The concentrate had a mayonaise-like consistency and exhibited pseudo-plastic behavior. The viscosity reached 71 centipoises at high shear rate. The consistency of the concentrate was reduced from 75 to 25 centipoises after deaerating for 4 days. Right after concentration, the slurry had a high consistency because it contained many tiny dispersed bubbles which behaved as rigid particles. These bubbles gradually floated to the top and disengaged from the slurry, leading to a reduction in consistency. The air entrainment took place near the end of the concentration cycle when the volume of slurry was insufficient to fill up the filtration system. This kind of air entrainment also took place during washing because the washed solids floated on water.

EXAMPLE 15

This example involved the effect of continuous washing on the concentrated precipitate.

The concentrated slurry of Example 14, which had been concentrated by cross-flow filtration and which contained 5.96 M Na+ (after some water evaporated), was washed continuously with 86 ml/min of process water. The washing went along smoothly, and no problem was encountered. The concentration of sodium, hydroxide, cesium-137 and the DF of each of them in the filtrate as a function of washing time are given in Table 23 below. The radioactivity of cesium-137 in the filtered washing solution increased from about 500 d/m/ml (detection limit) to $5.66\times10^4$ d/m/ml at the end of washing. The radioactivity due to Cs-137 increased because the CsTPB became more soluble as the sodium concentration was reduced. Partial dissolution of CsTPB during washing will not cause problems if the washing solution near the tail end is recycled or if a washing solution containing 0.005 M of NaTPB is used near the tail end of the washing cycle. The recycling of the tail end of the washing solution to the supernate feed is preferred because it is easier from operation considerations. The radioactivity of strontium and plutonium was actually decreased during washing which indicated that no significant amount of retained strontium and plutonium were solubilized during washing.

TABLE 23

The Concentration And Radioactivity Change In Continuous Washing As A Function Of Time

| Washing, Time, Min. | Sodium M | Hydroxide M | Cesium[(2)] Radioactivity | Cesium[(2)] DF | Strontium[(2)] Radioactivity | Strontium[(2)] DF | Plutonium[(2)] Radioactivity | Plutonium[(2)] DF |
|---|---|---|---|---|---|---|---|---|
| 0 | 5.96 | 2.45 | ND[(1)] | $>1.44\times10^6$ | $5.76\times10^3$ | 278 | $1.50\times10^2$ | 5 |
| 8 | 5.73 | 2.16 | ND[(1)] | $>1.44\times10^6$ | — | — | 57 | 14 |
| 20 | 4.07 | 1.29 | ND[(1)] | $>1.44\times10^6$ | $1.50\times10^3$ | 1067 | 30 | 27 |
| 40 | 2.47 | 1.44 | ND[(1)] | $>1.44\times10^6$ | — | — | 39 | 20 |
| 70 | 1.32 | 0.50 | ND[(1)] | $>1.44\times10^6$ | $2.12\times10^2$ | 7547 | 27 | 30 |
| 100 | 1.10 | 0.38 | $6.34\times10^3$ | $1.12\times10^5$ | $2.12\times10^2$ | 7547 | $1.55\times10^2$ | 5 |
| 160 | 0.48 | 0.13 | $4.02\times10^3$ | $1.79\times10^5$ | ND[(1)] | 16000 | ND[(1)] | <40 |
| 250 | 0.16 | 0.05 | $5.66\times10^4$ | $1.27\times10^4$ | ND[(1)] | 16000 | 66 | 12 |

Notes:
[(1)]ND = Not detectable
<500 d/m/ml for cesium
<100 d/m/ml of strontium
<20 d/m/ml of plutonium
[(2)]Feed radioactivity:
Cs = $7.2\times10^8$ d/m/ml
Sr = $1.6\times10^6$ d/m/ml
Pu = $8.13\times10^3$ d/m/ml

EXAMPLE 16

The concentrated precipitate from the nuclear waste is sent to a glass melter wherein it is incorporated in molten glass which is placed in stainless steel waste containers. The amount of sodium allowed from the concentrated precipitate to the glass melter is about 2 percent of the glass to reduce the glass leachability. To achieve this requirement the precipitate concentrate must be washed to remove the excess sodium.

For one stage washing about $2.71\times10^5$ gallons of wash water (approximately 27 percent of supernate volume) was required for one million gallons of supernate feed containing 3.5 M of sodium.

The washing cycle and wash water are reduced significantly when the precipitate concentrate was continuously washed. For example, if a steady stream of wash water (approximately equal to the filtrate flow) was mixed with the slurry before it reached the cross flow filter, the washing cycle was reduced from about 13 days to 3 days and water required from $2.71\times10^5$ to $8.24\times10^4$ (approximately 70 percent reduction).

By way of summary, the invention involves a precipitation process for decontaminating nuclear waste supernate. In the precipitation process, cesium is precipitated as cesium tetraphenyl boron and strontium and soluble platinum are adsorbed on sodium titanate. The final decontamination is accomplished by filtration. The insoluble plutonium in the supernate is also removed during filtration. Tests with synthetic and actual supernate show that the decontaminated supernate is significantly less radioactive than that obtained from the ion exchange process. A cross-flow filtration system equipped with an air-driven diaphragm pump, which is capable of very high decontamination and high filtrate flow rate is a preferred embodiment. The process is simple enough that it can be carried out inside a nuclear waste holding tank.

The foregoing description of preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. Process for the removal of the residual hazardous soluble values from a nuclear waste solution which comprises simultaneously contacting said solution with sufficient sodium tetraphenylboron and sufficient sodium titanate to form an insoluble slurry including said hazardous values and filtering said solution to separate and substantially decontaminate said solution of said hazardous values.

2. Process as claimed in claim 1 wherein said hazardous soluble values are selected from the group consisting essentially of cesium, plutonium and strontium.

3. Process as claimed in claim 1 wherein said hazardous values are isotopes of cesium, plutonium and strontium.

4. Process as claimed in claim 1 wherein said waste solution also contains significant quantities of the elements selected from the group sodium and potassium.

5. Process as claimed in claim 4 wherein said potassium is also removed from said waste solution.

6. Process for the decontamination of a nuclear waste solution containing cesium, strontium and residual amounts of soluble plutonium which comprises simultaneously contacting said waste solution containing said values with a solution of sodium tetraphenylboron in sufficient quantity to precipitate said cesium and with sufficient insoluble sodium titanate to sorb said strontium and said soluble plutonium from said waste solution to thereby form an insoluble slurry containing said cesium, strontium and plutonium, filtering said solution to separate said insoluble slurry and to provide a waste solution substantially decontaminated of said cesium, strontium and plutonium.

7. Process for the decontamination of a nuclear waste solution having cesium, plutonium and strontium values which comprises contacting said waste solution with sufficient sodium tetraphenylboron and sufficient insoluble sodium titanate to remove said cesium, plutonium and strontium values from said solution and recovering said solution which has been substantially decontaminated of cesium, plutonium and strontium.

8. Process as claimed in claim 1 wherein said solution contains up to 8.0 M of sodium ion.

9. Process as claimed in claim 7 wherein said contacting step is conducted for at least one quarter hour.

10. Process as claimed in claim 7 wherein an excess of the sodium tetraphenyl boron is used.

11. Process as claimed in claim 7 wherein said nuclear waste solution also contains potassium values and enough of said sodium tetraphenyl boron to also remove said potassium values.

12. Process as claimed in claim 7 wherein said nuclear waste is a nuclear waste supernate having hazardous levels of cesium, plutonium and strontium.

13. Process for the removal of cesium, plutonium and strontium values from a nuclear waste solution contaminated with said values which comprises simultaneously contacting said waste solution with sufficient sodium tetraphenylboron to precipitate said cesium and sufficient insoluble sodium titanate to sorb said plutonium and strontium, respectively, from said waste solution and filtering said waste solution to separate said solution which has been substantially decontaminated of cesium, plutonium and strontium.

14. Process as claimed in claim 13 wherein said filtration is achieved by cross-flow filtration means.

15. Process as claimed in claim 13 wherein a stream of wash water, approximately equal to the filtrate withdrawal rate from the filter, is continuously added to said wash solution during said filtration.

16. Process as claimed in claim 13 wherein said solution contains up to 8.0 M of sodium ion.

17. Process as claimed in claim 13 wherein said contacting step is conducted for at least one quarter hour.

18. Process as claimed in claim 13 wherein an excess of the sodium tetraphenyl boron is used.

19. Process as claimed in claim 18 wherein an excess of at least 0.0005 M of sodium tetraphenyl boron is used.

20. Process as claimed in claim 13 wherein said nuclear waste solution also contains potassium values and enough of said sodium tetraphenyl boron to also remove said potassium values.

21. Process as claimed in claim 13 wherein said nuclear waste is nuclear waste supernate hazardous levels of cesium, plutonium and strontium.

* * * * *